March 31, 1925.  1,531,905
C. DUCKE
SMOOTH PLANING MACHINE
Filed April 20, 1922
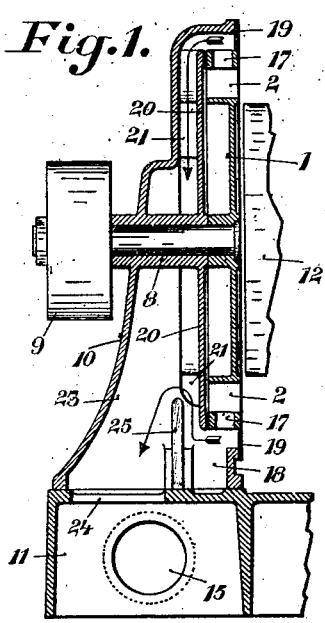
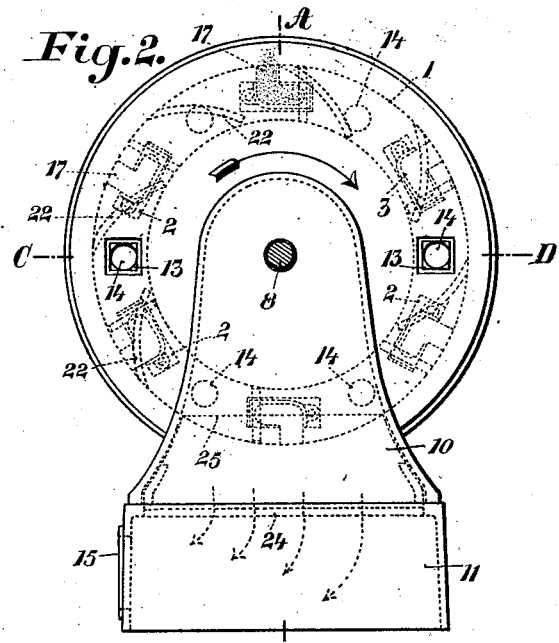
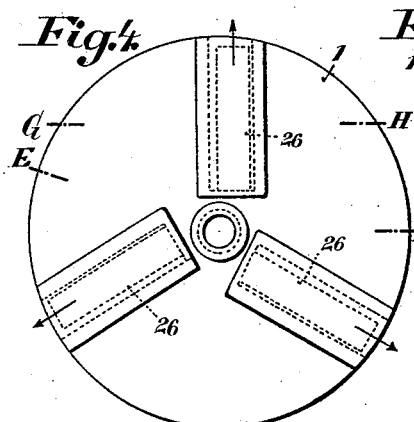
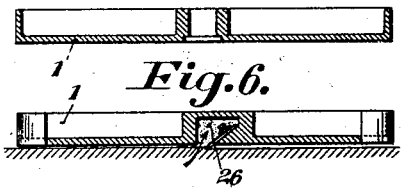
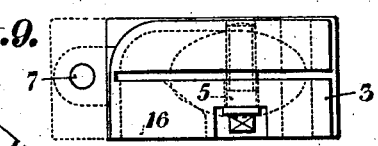
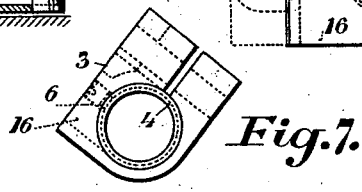

Patented Mar. 31, 1925.

1,531,905

UNITED STATES PATENT OFFICE.

CARL DUCKE, OF ERFURT, GERMANY.

SMOOTH-PLANING MACHINE.

Application filed April 20, 1922. Serial No. 555,799.

*To all whom it may concern:*

Be it known that I, CARL DUCKE, a citizen of the German Republic, residing at Erfurt, Germany, have invented certain new and useful Improvements in Smooth-Planing Machines, (for which I have filed an application for patent in Germany on April 28, 1921, under Serial Number D. 39620 XII/38e), of which the following is a specification.

This invention relates to a smooth planing machine specially designed for surfacing stamping blocks which are used in various industries as supports for stamping leather and the like. The machine is subordinately designed for general use.

The invention is based on the idea to draw off the chips and dust in a purely mechanical manner, without the aid of an air current produced by the rotation of the milling disk, by means of knife-holders of novel construction in which specially short hollow knives are mounted, and to conduct the chips and dust into hollow spaces of the milling disk so that they are prevented from getting on the table and so that the chips can collect only in a space which surrounds the milling disk and which is separated from the table.

The invention relates further to the conveying of the chips into a tubular conduit of a dust-removing arrangement with the aid of a casing of novel construction in which the space in which the milling disk rotates is separated by a partition standing perpendicularly to the cutter shaft from the space in which the chips are drawn off by the action of a suction current. This partition presents the advantage that only a comparatively feeble suction current is required for drawing off the chips from the casing. This process and further improvements according to the invention will be more fully described.

In order that the invention may be clearly understood, I shall proceed to describe the same with reference to the form of embodiment of the invention shown by way of example on the accompanying drawing, wherein:

Fig. 1 is a vertical section on line A—B of Fig. 2;

Fig. 2 shows the improved machine in side elevation.

Fig. 3 is a horizontal section on line C—D of Fig. 2.

Fig. 4 shows in elevation the facing cutter which comprises radial knives.

Fig. 5 is a section on line E—F of Fig. 4.

Fig. 6 is a cross section on line G—H of Fig. 4.

Fig. 7 is a front view.

Fig. 8 a longitudinal section, and

Fig. 9 a plan view of the knife holder with the knife.

Referring to Figs. 1, 2 and 3 of the drawings 1 designates a milling disk in which rectangular apertures 2 are uniformly distributed in proximity of the circumference. These rectangular apertures serve for the reception and mounting of improved knife holders 3, which are slit in the longitudinal direction. A hollow cylindrical knife 4 is clamped by means of screws 5 and held by a screw 6, the end of which fits into a groove of the knife 4, in a determined position with regard to the knife holder 3. An adjusting device 7 serves to adjust each holder 3 so that all the knives 4 project over the surface of the milling disk for the same distance.

The milling disk 1 is driven by the shaft 8 upon which a belt pulley 9 is keyed. The shaft 8 is journaled in the casing 10. The outer part of casing 10 encloses the greatest part of the milling disk 1.

The enclosing wall merges at the lower end into the foot part of the casing and forms at the point the space 18. By a ring 19, which is attached to casing 10, the inner space of the casing is separated from the table. The ring 19 forms together with the plane surface of the milling disk a plane surface from which project only the knives 4. A partition 20 arranged perpendicularly to the shaft and the diameter of which is of the same length as that of the milling disk 1, separates the casing into two separate chambers. In the open chamber turned towards the table, the milling disk is mounted so that its distance from partition 20 is only quite short. The second chamber 21, the parallel walls of which are braced by arc-shaped ribs 22, communicates with the central part of the casing which is enlarged at the lower end to form the foot part 23. This part is attached to the base plate 11 and communicates through an opening 24 of the base plate with the hollow space of the same. In the base plate 11 at 15 an opening is provided with which the tubular conduit is connected so that the chamber 21 of the casing can be connected with a dust removing device. The extended part of the base plate supports the parts of the machine which do not form the object of the invention and this part is therefore not shown nor described.

This machine operates as follows and has the effect which will be hereinafter described.

The wood block 12 to be smoothed is placed at such a distance from the milling disk 1 that the knives projecting from the same cut a groove or arc-shaped cross section into the surface of the block (Fig. 3). Peep holes 13, the axes of vision of which are situated in the same diameter as the rotating cutters 4, permit to observe the groove. Holes 14 cast into the milling disk in the same diameter as the peep holes 13 permit to observe the milling groove. If the milled groove has the required depth the block is at once conducted along the milling disk so that its surface is made smooth and plane. The improved knife holders have hollow spaces 16 which serve for the reception of hollow cylindrical knives 4 which are as short as possible, and which communicate with radially extending hollow spaces 17 of the milling disk 1. By this arrangement the chips which get into the hollow spaces of the knives are transferred in the shortest way, into their natural, radially centrifugal direction of movement whereby a clogging of the hollow spaces of the knives is prevented, and the chips are thus separated absolutely from the table during their travel through the hollow spaces 16 of the knife holders and through the hollow spaces 17 of the milling disk 1, so that the chips cannot drop back upon the table.

The most essential point of the invention is the arrangement of the radially extending hollow spaces 16 and 17 as closely as possible to the milling surface.

Through these hollow spaces the chips are removed directly behind the cutting edges of the knives, whilst with longer hollow knives of known type clogging will take place. This will be proved by the following explanations.

It is usual to impregnate the blocks with stamping oil similar to varnish in order to preserve the cutting edges of the stamping knives. The chips from these impregnated blocks are therefore rather sticky. The chips which have penetrated into the hollow knives, the longitudinal axes of which form tangents to the milling circle, have therefore the tendency to fly radially in outward direction owing to their centrifugal force, wherefrom results that the chips are pressed in the hollows of the knives against the walls of the hollows which are situated upon the off side. The result from this natural tendency increased by the sticky nature of the chips is that the chips adhere upon these walls of the hollow space, where they accumulate rapidly so that in a very short time the hollow knives of known type become clogged. Owing to the arrangement of the hollows 16 and 17 the clogging of the hollow knives is prevented.

The removal of the chips through the hollow spaces 16 and 17 into the outer part of the casing 10 is effected mechanically without the aid of any air current produced by the rotation of the milling disk. This mechanical removal of the chips from the table is independent of the speed of the milling disk. This circumstance is of special advantage as will be proved by the following statement:—

The most effective cutting speed of the knives designed to mill stamping blocks must not exceed 4–5 m. per second, in order to prevent the knives getting blunt too rapidly. It is known that the cutting edges of the knives act perpendicularly upon the wood fibres of the block composed of several parts made from hard wood, so that a considerably greater resistance is opposed to the knives than at the working of long cut wood. The low circumferential speed of the milling disks resulting from this condition permits only the production of a feeble air current which would have to be considerably increased by an air current from a fan if the air current had to be sufficiently strong to really remove the chips from the table. In the machine according to the present invention the chips are removed from the block through the hollows of the hollow knives and transferred, already at a short distance from the cutting edges, with the aid of the improved knife holders owing to their individual centrifugal force into the inner space of the milling disk. By this removing of the chips into the inner space of the milling disk it is absolutely prevented that the chips drop back upon the table even if the milling disk revolves at low speed, so that the removal of the chips is absolutely ensured.

The chips coming out of the hollow spaces 17 of the milling disk get into the outer part of the casing 10. This part is separated from the surface to be milled by a ring 19, the inner diameter of which can extend up to the circumference of the milling disk, so that the chips cannot drop back upon this surface. The chips which have got into the outer part of the casing by this natural way owing to their individual centrifugal force are conducted over the partition 20, with the aid of a suction fan, to drop into the chamber 21 which is separated from the milling disk 1 and the chips travelling along the arc-shaped ribs 22 of this chamber get through the enlarged part 23 of the casing, the opening 24 and the hollow space of the base plate 11 at 15 into the suction conduit.

This removal of the chips through the casing separated into two separate chambers has the effect that only a very feeble current of suction air is required for the removal of the chips as will be seen from the following explanation.

It is generally known that every rotating disk, specially if the same is reinforced by radially extending ribs as is the case with the milling disk 1, produces an air current which is directed radially outward.

With casings having only one compartment, which are commonly used at present, and which serve for the removal of chips or dust and which are arranged around polishing or grinding disks and the like, these air currents radially directed outward have a detrimental action on the effect of the suction air current which is introduced into the casing to remove the chips. The reason for this detrimental action is, that the directions of these two air currents oppose one another for the greatest part. In the present case the chips have to be conducted from space 21 into the enlarged part 23 and from there through the opening 24 of the base plate in the directions indicated in Fig. 2 by arrows through the hollow space of the base plate and finally through the opening 15 into the fan conduit. The direction of the suction air which comes from the fan conduit and which is designed to remove the chips from the casing is downwardly directed in the casing whilst the air current produced by the rotation of the milling disk is radially and outwardly directed. Only at a small part, viz the lowest part of the circumference of the milling disk, these two air currents are of equal directions. At the largest part of the circumference of the milling disk however, specially at the upper part of the same, the radial air currents produced by the rotation of the milling disk are opposed in direction to the downward movement of the suction air, wherefrom results that eddies are produced and consequently the sucking effect is reduced. This inconvenience is overcome by the partition 20 as by this partition the air currents produced by the rotation of the milling disk and radially directed outward are absolutely separated from the downwardly directed movement of the suction air. The chips escape from the improved casing absolutely unhindered by the movement of the air produced by the milling disk. This removal of the chips is effected by means of a suction current which is only feeble whilst in a casing of known type comprising only one compartment and without the partition 20 the suction current required for the sucking off of the chips must be at least so strong that it overcomes the radial air currents produced by the rotation of the milling disk. Owing to the sucking action acting from below a greater quantity of air is sucked off at the lower part of the casing and consequently also at the lower part of the circumference of the milling disk than at the upper part of the circumference as the distance over which the suction air has to travel from the lower part of the casing to the opening 24 is much shorter than the distance from the upper part of the casing. In order to ensure over the entire circumference of the milling disk as uniform a sucking action as possible the throttling slide 25 is arranged. This throttling slide 25, made of wood or of any other convenient material, is mounted between two pairs of ribs in the foot part of the casing and designed to separate space 18 from space 23. The height of the throttling slide 25 has to be determined by experiment, the material at the upper edge of the throttling slide having to be removed until a uniform sucking action is observed by measurings at the circumference of the rotating milling disk.

The machine tool described permits also to execute milling work with milling disks having radially arranged knives of known type. The milling disks are of improved construction as shown in Figs. 4, 5 and 6.

Above the radial knives channels 26 are arranged in such a manner that the chips which are pushed at the working of the machine over the knives into these channels can not fly off at the side of the milling surface turned away from the milling disk, but are in the channels 26 absolutely separated from the table and retained.

Owing to their individual centrifugal force the chips travel in radial direction through the channels 26 and move away from the milling disk only at the circumference of the same.

This takes place in a similar manner as with the milling disk with hollow knives without the aid of any artificially produced air movement, and consequently in a purely mechanical manner. The chips getting into the outer part of the casing 10 from the milling disk are from there conducted along the same way as hereinbefore described with reference to the milling disk with hollow knives. For milling disks of this type with radially directed knives the use of the improved casing separated into two chambers by the partition 20 presents the same advantage as above described. In Fig. 4 the three arrows indicate the direction of the chips coming from the channels 26. According to this illustration the chips from the channel, which is shown in vertical position, flow, according to this illustration, exactly in upward direction. The direction of the suction air which sucks these chips downward is therefore opposed to the direction of the projected chips. If those milling disks rotated in a casing of known type comprising only one compartment the chips would therefore be sucked downward only if the suction force of the fan is superior to the centrifugal force of the chips. With the aid of a partition 20 these two forces are absolutely separated from one another so that a quite feeble suction current is sufficient to remove the chips from the casing.

I claim:—

1. A smooth planing machine for stamping blocks and hard wood comprising in combination with the knife holders and the milling disk radially directed channels in said milling disk between the points of bearing of the knife holders and the circumference of the milling disk designed to keep away from the surface to be milled chips which have got into said channels.

2. A smooth planing machine for stamping blocks and hard wood comprising in combination a milling disk having radially directed channels, hollow knife holders mounted in said milling disk in proximity to the circumference of said disk said knife holders having cavities with radially directed outlets communicating with the radially directed channels of said disk, and hollow knives in said cavities of said knife holders.

3. A smooth planing machine for stamping blocks and hard wood comprising in combination a milling disk having radially directed channels, hollow knife holders mounted in said milling disk in proximity to the circumference of said disk and having cavities with radially directed outlets, short hollow knives in said knife holders projecting with one end from the cavities of said knife holders their other end being enclosed by said cavities.

4. A smooth planing machine for stamping blocks and hard wood comprising in combination with a driving shaft a milling disk upon said shaft, hollow knives in said milling disk having outlet openings directly behind their cutting edges, a casing for the removal of the chips with a partition in said casing arranged perpendicularly to said shaft closely to said milling disk so that this milling disk is separated from the part of the casing which is designed for removing the chips.

5. A smooth planing machine for stamping blocks and hard wood comprising in combination a milling disk having radial channels terminating in the edge of the circumference of the disk, radial knives in said disk under said channels, a casing tightly enclosing said milling disk, a sheet iron ring fixed on said casing in the plane of the surface milling disk for closing the gaps between the circumference of the milling disk and the casing and designed to keep away from the milling surface the chips which come out of said radially directed channels of the milling disk.

In testimony whereof I affix my signature in presence of two witnesses.

CARL DUCKE.

Witnesses:
 RUD E. FRICKE,
 HERBERT DOHERENY.